July 26, 1938.  J. B. CASTNER ET AL  2,124,729
CONCENTRATING ACID SOLUTIONS
Filed June 6, 1934
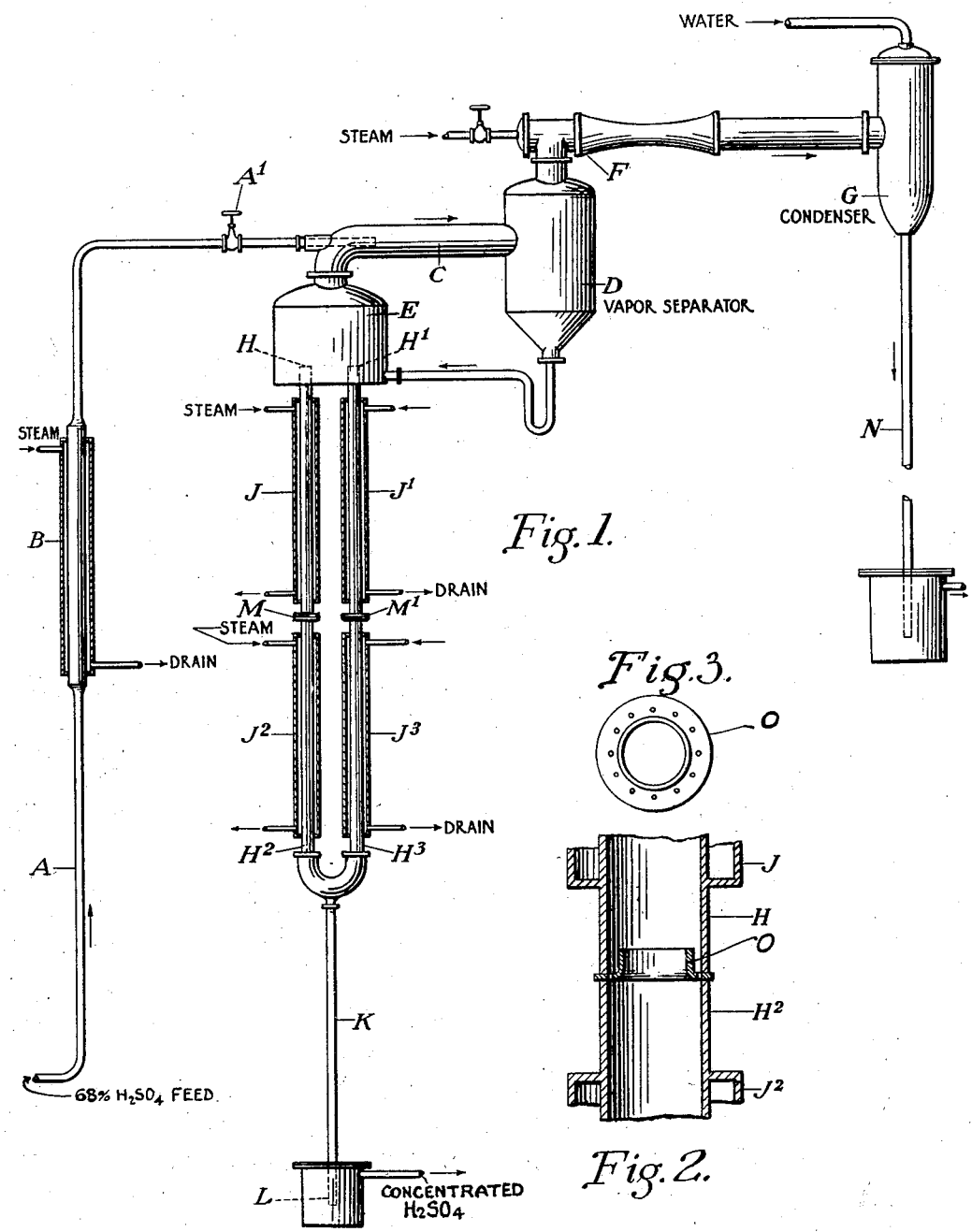
INVENTORS.
JAMES B. CASTNER,
RALPH F. PETERSON
BY
ATTORNEY.

Patented July 26, 1938

2,124,729

UNITED STATES PATENT OFFICE 2,124,729

CONCENTRATING ACID SOLUTIONS

James B. Castner and Ralph F. Peterson, Woodbury, N. J., assignors to E. I. du Pont de Nemours & Company, Wilmington, Del., a corporation of Delaware Application June 6, 1934, Serial No. 729,208

4 Claims. (Cl. 23—169)

This invention relates to a new and improved process and apparatus for the concentration of acid solutions and more particularly to a process and apparatus for the concentration of aqueous solutions of sulfuric acid.

The concentration of sulfuric acid is a matter of great technical and economic importance, both in the case of relatively weak acids such as are obtained by the lead chamber process and of initially strong acids which have become diluted in the course of manufacturing operations. This latter situation is due to the fact that concentrated sulfuric acid is a widely used dehydrating agent. As a specific example may be cited the concentration of nitric acid such as is obtained in the ammonia oxidation process, in which strong sulfuric acid is commonly employed as the dehydrating means. Whereas the acid used at the beginning of the process may have a strength, for example, of 88 to 109% $H_2SO_4$, the denitrated residual acid usually contains less than 70% $H_2SO_4$. In order that this acid may be available for further use, concentration is necessary.

Various methods for concentrating sulfuric acid are in use at the present time. One of the older of these comprises evaporation in open pans, usually with direct heating, either by the passage of hot gases over the surface of the liquid, or by heating the pans from below. Such vessels are preferably made of lead for the lower concentrations and of iron for higher strengths. This so called pan house method, however, possesses the disadvantages of poor heat transfer with resulting low fuel efficiency, and high maintenance costs.

Another process that has been practiced consists in the evaporation of sulfuric acid under reduced pressure by means of a liquid heating medium flowing through coils or other suitably designed heating elements immersed in the acid, and hence maintained out of direct contact with it. The hot oil, steam, or other heating fluid, is kept at a temperature considerably above that of the main acid solution, and the rate of evaporation is regulated by control of the temperature of the heating medium and the degree of vacuum. While this process has some merits, it has the disadvantage of requiring a large acid-proof vacuum vessel having numerous connections for the heating elements, which latter have a separate heater, particularly where a liquid medium is used. In addition, the process allows the accumulation of mud under conditions where removal is somewhat difficult. Finally the operation is a batch process and involves maintaining a large amount of acid in the boiling vessel.

An additional method in extensive use contemplates a long horizontal steel drum, divided for example into three compartments, the front one consisting of a combustion chamber for furnishing gases at a very high temperature. Two concentration chambers, lined with acid-resisting brick and partly filled with hot acid, are arranged beyond this, into which the hot gases are introduced successively for evaporating the water from the acid, the gases being released beneath the surface of the acid in both chambers. The final concentration is brought about in the first chamber, while in the second chamber the cooler gases come in contact with the weaker acid and serve to preheat it. In other words the acid and hot gases flow countercurrent to one another.

The gases issuing from the rear chamber are passed through a high voltage electric precipitator for the removal of acid mist. This type of concentrator has the disadvantage of causing a fume nuisance unless the electric precipitator functions perfectly, and at best of requiring an expensive installation, in which the cleaning of the various parts, where acid mud may collect, is difficult. In addition, the concentrated acid is often discolored by the gases from the combustion chamber. While this type is continuous in operation, it has the disadvantage of holding large quantities of acids whether in service or not. If for any reason this charge is removed, considerable time is required to reestablish equilibrium.

A more recent method brings about the concentration of the sulfuric acid in steam-jacketed horizontal tubes, arranged in series or in the form of a cascade. Atmospheric pressure or vacuum may be employed, and the steam pressure required will depend on the pressure within the apparatus. While this apparatus is continuous and holds a minimum of acid, it has the disadvantage that not all of the surface of the tubes is utilized for heating purposes, since the horizontal tubes are only partly full of acid. Furthermore, accumulation of mud takes place within the tubes, with resulting impairment of the heat transfer.

From the foregoing discussion of available methods for the concentration of sulfuric acid, it is apparent that all of the types developed so far have been found in practice to have serious disadvantages from the point of view of design, materials of construction, thermal efficiency, low capacity, or high maintenance costs. It may be said, therefore, that, in spite of the very large amount of effort devoted to this important subject, the results have been far short of the ideal solution.

The object of our invention is an improved process for concentrating acid solutions. A further object is a process for the concentration of aqueous sulfuric acid solutions with more efficient utilization of the heat supplied for the evaporation. A still further object is a continuous process utilizing an apparatus that is simple in construction and accessible for cleaning. Another object is an improved apparatus for carrying out our process. Additional objects will become apparent as the invention is further described hereinafter.

We have found that the foregoing objects are accomplished when the sulfuric acid, or other liquid to be concentrated, is caused to flow in a condition of high surface exposure, for example in the form of a thin layer or film, down over the inner surface of one or more substantially vertical, externally heated tubes. This film forms as the result of proper distribution and of gravity, and is not conditioned on the action of the evolved vapors, which flow counter-current to it.

The external heating required may be applied in various ways. Preferably, however, the tubes are jacketed, the jackets being filled with a hot fluid heating medium. As such heating medium, steam may be used, preferably under high pressure. The vapors of other high boiling liquids may, however, be utilized with advantage, as for example, mercury, diphenyl, diphenyl oxide, and the like. Hot liquids, such as hot oil or fused salt mixtures, may also be used to supply the necessary heat, in which case it is preferable to circulate them through the jackets countercurrent to the flow of acid within the tubes.

We find it desirable to operate under vacuum by introducing the aqueous solution of sulfuric acid or other liquid into an evaporator chamber under reduced pressure. The acid will preferably be hot and at a temperature such that it will boil at the pressure existing in said chamber, thereby bringing about a preliminary concentration. The partially concentrated acid then passes to a suitably designed distributing vessel, from which it flows down over the inner surfaces of one or more vertical tubes heated externally, preferably by high pressure steam within surrounding jackets.

When the process is carried out under atmospheric pressure, a very high temperature of the heating medium is necessary, which is higher in general than can be obtained with steam. Under such conditions, the use of high temperature heat transfer agents such as diphenyl vapor or mercury is possible, although this is a relatively expensive procedure. High temperature furnace gases may also be used as a heating means, although this renders the temperature control difficult, and there is the added danger with such high temperatures that the tubes may become bent, distorted, or even broken. When a vacuum is employed, however, steam may be used satisfactorily as the heating agent, preferably at pressures of 140 to 250 lbs. per square inch when the degree of vacuum is between 29.0 and 29.5 inches.

By way of illustration, one form of apparatus for carrying out our process is shown in Figure 1, in which the acid to be concentrated, for example 68% $H_2SO_4$ flows through pipe A, through the regulating valve A', and into the large vapor line C, under vacuum. If the acid is cold at the outset, it may be preheated by means of the steam circulated in preheater B. As the vapor line C is under a vacuum of around 29", the acid should be heated to a temperature such that it will boil within the vapor line C, for example to 300° F. This spontaneous boiling of the acid brings about a preliminary concentration and an increase of several per cent in the acid strength.

The boiling acid then passes from line C into the vapor separator D, where the liquid and vapor are separated. The acid passes from the bottom of this vessel into the distributor E, preferably a lead-lined steel vessel, into which the vertical pipes H and H' project. These pipes, which have an inside diameter of about 8", are steam-jacketed below the distributor by the tubes J and J'. As the acid continuously enters the distributor, it overflows the ends of the vertical tubes and then passes down and over the inner heated surfaces of said tubes in the form of a thin layer or film, thereby losing a substantial amount of its water content and becoming concentrated. The lengths of these tubes may be extended, if desired, by the addition of tubes $H^2$ and $H^3$, fitted with jackets $J^2$ and $J^3$, as shown in Figure 2. In order not to disturb the falling film of acid at the junctions M and M' of these tubes, the adjoining ends should be ground to equal inside diameters, or, if desired, a re-distributor O, shown in sectional elevation in Figure 2, and in plan view in Fig. 3, may be inserted at M and M'. Steam at 250 lbs. pressure may be used as the heating medium within the jacketing tubes.

The concentrated acid flows from the bottom of the tubes down the barometric leg K, consisting, for example, of a water-jacketed heavy lead pipe. If the conditions of rate of feed, vacuum, and length of vertical concentrating tubes have been properly controlled, an acid of 93% $H_2SO_4$ will be obtained at the outlet L. The vapors evolved by the boiling acid in the vertical tubes, pass into vapor line C, where they come in intimate contact with the hot, weak feed. They then pass on into the vapor separator D, where the liquid and vapor are substantially completely separated. By this arrangement, the vapors leaving the top of the separator and passing on to the source of vacuum, consist essentially of water only. In the sketch, vacuum is supplied by the steam booster ejector F and the condenser G, under which conditions the water vapors are absorbed and condensed.

The length of tubes is dependent on the degree of vacuum, the rate of feed, and other factors, but a satisfactory length has been found to be about 20 feet. In general, it may be stated that if the acid feed contains between 60 and 70% $H_2SO_4$, the concentrated acid should have a strength of 88 to 93%. Preferably the vertical tubes employed should be of relatively large diameter, 8 or 12 inches for example, since the desired evaporating surface is thereby obtained. Using such large diameter tubes, separate jacketing means can be maintained for each tube. A different apparatus assembly results, therefore, from that present when a cluster of small tubes is contained within a single jacketing shell.

The use of very small diameter tubes, 1 to 2 inches in diameter for example, is not desirable in the present apparatus, since tubes of the length necessary for our process can only be made in very short lengths, when the tube material consists of the acid-resistant alloys required. Furthermore, with a common jacket leaks of the heating medium enter the acid side of the concentrator with undesirable results whereas, with large tubes having independent jackets, leaks cause no particular difficulty. Preferably our large diameter tubes are serrated, perforated, or otherwise so formed on their upper emergent ends as to facilitate the distribution of the down-flowing liquid uniformly over the inner surfaces of the tubes.

The method of concentration described has many advantages over those previously employed. The apparatus is simple, and is therefore easily and automatically cleaned of the mud which accumulates in most known types. This cleaning operation may, for example, be carried out by changing from the normal acid feed to a flow of water. A high heat transfer is obtained as a result of the high velocity thin film which presents a maximum of vapor disengaging surface per unit weight of acid.

The process is a continuous one and relatively small quantities of acid are present at any one time. This latter feature, together with simplified construction, results in low initial cost and in a minimum of maintenance expense. Since the vapors leaving the system are substantially in equilibrium with hot, weak acid, the loss of sulfuric acid is at a minimum. In addition, all fume nuisances are readily avoided.

While our process has been described, particularly with reference to sulfuric acid, it will be apparent that it is well adapted for use in the concentration and distillation of all corrosive acid solutions. In addition to sulfuric acid, the aqueous solutions of nitric acid and acetic acid, for example, may be concentrated by the method described. It will be understood, of course, that the apparatus in contact with the hot corrosive acid must be made of a suitable acid-resistant material, for example, high silicon irons, high silicon-nickel alloys, and the like. Preferably, acording to our invention, the downflowing film of acid passes counter-current to the aqueous vapors evolved. Such a method of operation is the most efficient and the examples given follow this procedure.

In the foregoing, the process and apparatus for carrying out our improved concentration process have been described at length. It will be understood, however, that many variations in the details of operation may be introduced, as well as various additional known steps. We intend, therefore, to be limited only as indicated in the following patent claims:

We claim:

1. The process of concentrating sulfuric acid in a closed system, which process comprises introduced an aqueous solution of sulfuric acid into said system maintained under vacuum, bringing said acid into a distributing chamber where it is caused to flow into at least one substantially vertical heated tube, maintaining a flow of the acid continuously in the form of a thin layer down and over the inner surface of said vertical tube, causing said acid to boil during its down-flow, passing the water vapors evolved from the down-flowing thin layer of acid, together with entrained acid, to a vapor separating chamber, there separating said entrained acid from said vapors, and passing said separated entrained acid back to the distributing chamber, and leading the separted vapors from the system.

2. The process of concentrating sulfuric acid in a closed system, which process comprises introducing a hot aqueous solution of said acid into said system, maintained at a pressure sufficiently less than atmospheric so that boiling and partial concentration of the hot acid takes place as a result of the sensible heat content of the entering acid and the reduced pressure conditions prevailing, thereby bringing about a preliminary concentration of the acid, separating all vapors from the liquid acid, subsequently introducing said partially concentrated acid into the upper end of at least one substantially vertical heated tube, maintaining a flow of said partially concentrated acid continuously in the form of a thin layer down and over the inner surface of said vertical tube, passing the water vapors evolved from the down-flowing thin layer of acid during the process of concentration, together with entrained acid into contact with the incoming hot acid, and thence to a separating chamber, and there separating said entrained acid from said vapors.

3. The process of concentrating sulfuric acid in a closed system, which comprises introducing a hot aqueous solution of said acid into a separating chamber, maintained at a pressure sufficiently less than atmospheric so that boiling and partial concentration of the hot acid takes place as a result of the sensible heat content of the entering acid and the reduced pressure conditions prevailing, thereby bringing about a preliminary concentration of the acid in said chamber, separating all vapors from the liquid acid, subsequently conveying said partially concentrated acid to the upper end of a vertical heated tube, maintaining a flow of said partially concentrated acid continuously in the form of a thin layer down and over the inner surface of said substantially vertical heated tube, passing the water vapors evolved from the down-flowing thin layer of acid during the process of concentration, together with entrained acid, to the aforesaid separating chamber and consequently into contact with the inflowing hot aqueous acid solution.

4. An apparatus for the concentration of solutions of liquid corrosive acids, which comprises at least one substantially vertical tube of acid-resistant material, an individual jacketing means surrounding each of said tubes and adapted to contain a heating medium for heating said tubes, a distributing chamber surrounding the top of the tubes for accumulating and maintaining a pool of liquid within said chamber for distribution over the upper ends of the tubes in the form of a film, a separating and preliminary evaporation chamber, in direct communication with said distributing chamber by a means which permits the vapors evolved during concentration of the acid to pass from said distributing chamber to said preliminary evaporation chamber, a separate means for allowing the flow of liquid acid from said preliminary evaporation chamber to said distributing chamber, means for introducing feed acid into the separating and preliminary evaporation chamber, and a means for maintaining the pressure in the system substantially less than atmospheric.

JAMES B. CASTNER.
RALPH F. PETERSON.

CERTIFICATE OF CORRECTION.

Patent No. 2,124,729.                          July 26, 1938.

JAMES B. CASTNER, ET AL.

It is hereby certified that error appears in the printed specification of the above numbered patent requiring correction as follows: Page 3, first column, line 57, claim 1, for the word "introduced" read introducing; and that the said Letters Patent should be read with this correction therein that the same may conform to the record of the case in the Patent Office.

Signed and sealed this 27th day of September, A. D. 1938.

Henry Van Arsdale (Seal)                              Acting Commissioner of Patents.